US006829987B2

(12) United States Patent
Gawlitta et al.

(10) Patent No.: US 6,829,987 B2
(45) Date of Patent: Dec. 14, 2004

(54) BELT-TYPE PARTICLEBOARD PRESS

(75) Inventors: Werner Gawlitta, Tegelen (NL); Lothar Sebastian, Duisburg (DE); Klaus Schürmann, Jüchen (DE); Horst Weiss, Krefeld (DE)

(73) Assignee: Siempelkamp Maschinen- und Anlagenbau GmbH & Co. KG, Krefeld (DE)

( * ) Notice: Subject to any disclaimer, the term of this patent is extended or adjusted under 35 U.S.C. 154(b) by 123 days.

(21) Appl. No.: 10/262,627

(22) Filed: Sep. 30, 2002

(65) Prior Publication Data

US 2003/0066441 A1 Apr. 10, 2003

(30) Foreign Application Priority Data

Oct. 4, 2001 (DE) ........................................ 101 48 956

(51) Int. Cl.[7] ................................................ B32B 31/20
(52) U.S. Cl. ....................... 100/311; 100/157; 100/313; 425/371; 156/583.5
(58) Field of Search .......................... 100/151 LR, 306, 100/311 LR, 313 LP; 264/109, 119, 314; 425/371 LR, 373, 363, 369 R; 156/555, 580, 582, 583.5 LP

(56) References Cited

U.S. PATENT DOCUMENTS 4,541,889 A * 9/1985 Held ....................... 156/583.5
4,881,888 A * 11/1989 Folkesson ................... 425/371
5,063,010 A * 11/1991 Fischer et al. .............. 264/109
5,520,530 A * 5/1996 Siempelkamp .............. 425/371
5,611,743 A * 3/1997 Bielfeldt ..................... 474/101

* cited by examiner

*Primary Examiner*—Allen Ostrager
*Assistant Examiner*—Shelley Self
(74) *Attorney, Agent, or Firm*—Herbert Dubno; Andrew Wilford

(57) ABSTRACT

A continuous belt press has upper and lower platens defining a horizontal gap. Upper and lower upstream drums and downstream are rotatable on the frame about respective horizontal drum axes at the upstream and downstream ends of the gap. Upper and lower endless steel belts spanned over the respective upper and lower drums each have a working stretch supported by respective upper and lower sets of rollers on the respective platens. Each belt has a pair of edges projecting transversely past the respective rollers and at least one of the drums of each of the belts has a substantially cylindrical central region of a predetermined central diameter bearing through the respective rollers on the working stretch of the respective belt and a pair of edge formations of smaller diameter than the central-region diameter lying outside the central region and in engagement with the edges of the respective belt.

4 Claims, 3 Drawing Sheets

BELT-TYPE PARTICLEBOARD PRESS

FIELD OF THE INVENTION

The present invention relates to a continuous press. More particularly this invention concerns belt-type press used for making wood panels, e.g. particleboard, flakeboard, plywood, chipboard, and the like.

BACKGROUND OF THE INVENTION

A standard belt press has a frame having horizontally extending and vertically spaced upper and lower heated platens defining a horizontally extending gap having an upstream end and a downstream end, vertically spaced upper and lower upstream drums rotatable about respective horizontal axes at the upstream end, vertically spaced upper and lower downstream drums rotatable about respective horizontal axes at the downstream end, and upper and lower endless belts spanned over the respective upper and lower drums and each having a working stretch lying between the platens and a return stretch. Upper and lower sets of rollers engaged between the working stretches and the respective platens can be recirculated as the belts are advanced to move with the working stretches horizontally in a transport direction to displace a workpiece in the direction through the gap so that the working stretches are supported on the respective platens by these rollers.

As a rule, the belts are so wide that they extend transversely, that is perpendicular to their movement direction, past the rollers. Edge regions of the belts therefore are not in contact with the rollers and therefore the heat from the respective platens is not transmitted to them so that they are substantially cooler, often as much as 80° C. cooler, than the central region.

As a result the stainless-steel belts are going to be, in effect, longer in a central region than in these cooler edge regions. The result is that the tension in the belts is greater in the effectively shorter edge regions than n the center, leading to premature failure of the belts at the overstressed edge regions.

The solution to this problem is to use narrower belts that do not extend past the ends of the support rollers. While this construction ensures that the entire belt is at roughly the same temperature so that the edge regions have the same effective length at the center region, it has the considerable disadvantage that it leaves the rollers exposed at their ends. Hence the rollers can get fouled so that the press must be cleaned more often.

OBJECTS OF THE INVENTION

It is therefore an object of the present invention to provide an improved belt-type particleboard press.

Another object is the provision of such an improved belt-type particleboard press which overcomes the above-given disadvantages, that is which ensures adequate protection of the belt-support rollers while at the same time preventing excessive localized stress in the belts.

SUMMARY OF THE INVENTION

A continuous belt press has a frame having horizontally extending and vertically spaced upper and lower platens defining a horizontally extending gap having an upstream end and a downstream end. Vertically spaced upper and lower upstream drums are rotatable on the frame about respective horizontal drum axes at the upstream end, and vertically spaced upper and lower downstream drums are rotatable on the frame about respective horizontal drum axes at the downstream end. Upper and lower endless steel belts spanned over the respective upper and lower drums each have a working stretch lying between the platens and a return stretch. Upper and lower sets of rollers are engaged between the working stretches and the respective platens. A drive connected to the drums advances the belts to move the working stretches horizontally in a transport direction to displace a workpiece in the direction through the gap. According to the invention each belt has a pair of edges projecting transversely past the respective rollers. Furthermore at least one of the drums of each of the belts has a substantially cylindrical central region of a predetermined central diameter bearing through the respective rollers on the working stretch of the respective belt and a pair of edge formations of smaller diameter than the central-region diameter lying outside the central region and in engagement with the edges of the respective belt.

Thus with this system the distance around the drums is in effect shorter at the belt edges so as to accommodate these edges which, as a result of being cooler, are shorter than the central regions of the belts. The belts will therefore be under substantially the same tension over their entire widths, not under greater tension at the edges as in the prior-art systems, so that they will have a much longer service life. Furthermore it is possible to use relatively wide belts, thereby effectively protecting the rollers and drums, something that is extremely important with, for instance, the highly sticky binder used in the production of medium-density-fiber panels.

The one drum of each of the belts in accordance with the invention is provided in its central region with friction pads forming a cylindrical drum outer surface and with end rings flanking the friction pads and forming the edge formations. These pads are normally of some high-friction material that is bonded to flexible metal mounting strips that are themselves bolted to the respective drums.

It is within the scope of this invention for both of the drums of each belt to be shaped according to the invention, but it is also possible for only one drum of each belt to be thus shaped.

The edge formations according to the invention can form radially outwardly convex curved surfaces engaging the respective edges. Alternately they form frustoconical surfaces engaging the respective edges and centered on the respective axes.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
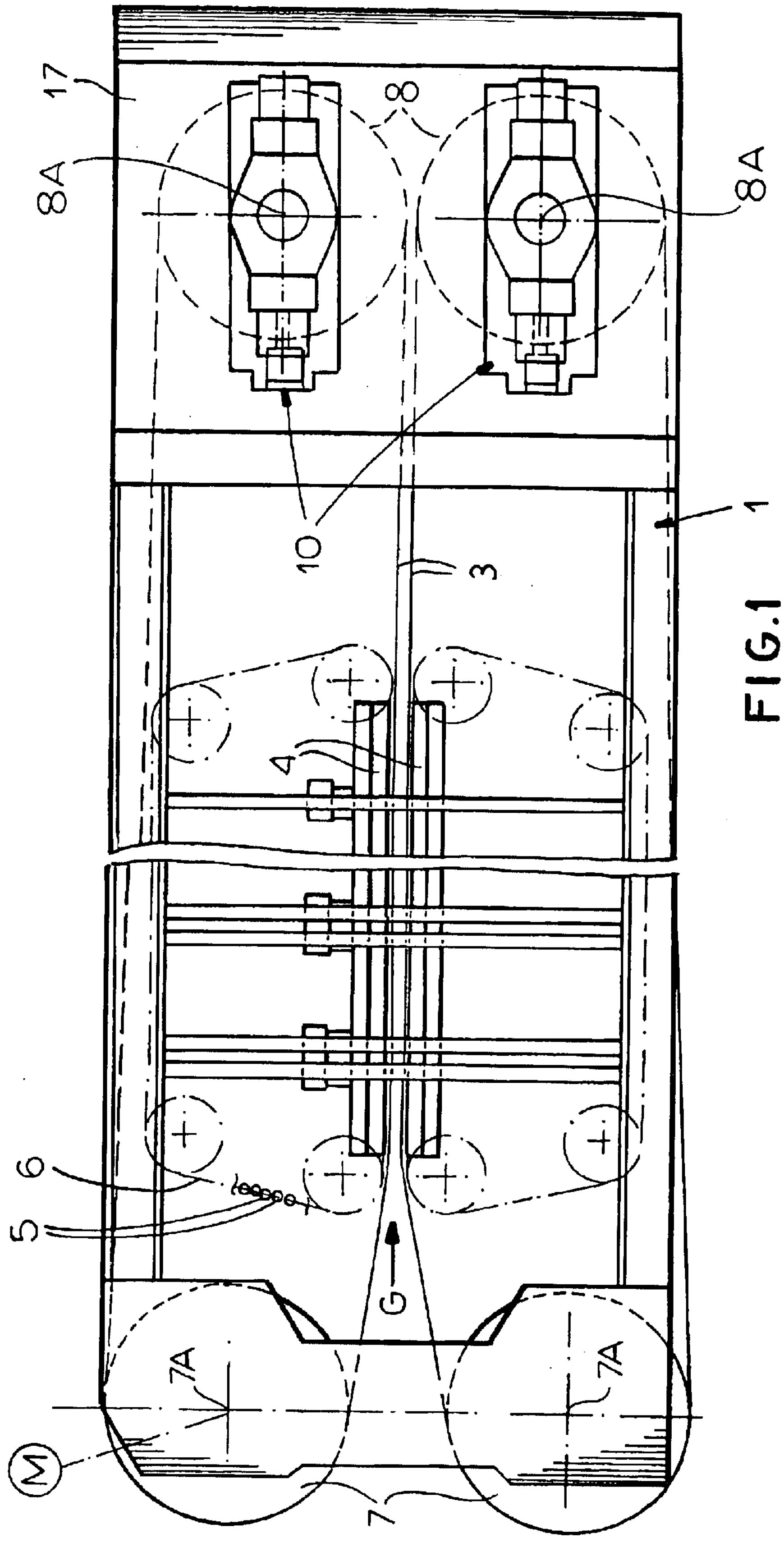
FIG. 1 is a partly diagrammatic side view of a belt-type press in accordance with the invention.

As seen in FIG. 1 a continuous particleboard press 1 in accordance with the invention has a frame 17 having horizontally extending and vertically spaced upper and lower heated platens 4 defining a horizontally extending gap G having an upstream end (to the left in FIG. 1) and a downstream end (to the right in FIG. 1). Vertically spaced upper and lower upstream drums 7 are rotatable about respective horizontal axes 7A at the upstream end, and vertically spaced upper and lower downstream drums 8 are rotatable about respective horizontal axes 8A at the downstream end. Identical upper and lower endless stainless-steel belts 3 are spanned over the respective upper and lower drums 7 and 8 and each have a working stretch lying between the platens 4 and a return stretch.

Figure 2:
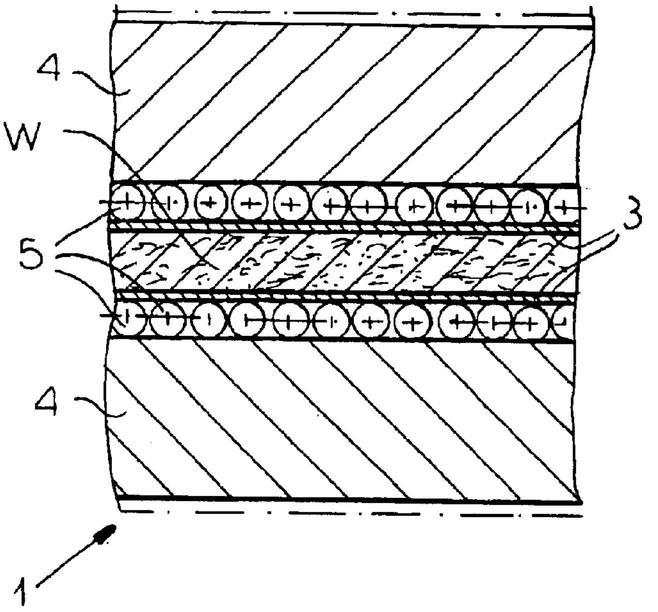
FIG. 2 is a large-scale sectional detail of FIG. 1.

Upper and lower sets of rollers 5 engaged between the working stretches and the respective platens 4 are recirculated as the belts 3 are advanced to move with the working stretches horizontally in a transport direction to displace a workpiece W (FIG. 2), here a mat of wood chips mixed with a thermally activated binder to be pressed into a rigid board, in the transport direction through the gap G so that the working stretches are supported on the respective platens 4 by these rollers 5. Respective chains 6 carry the rollers 5 so they can recirculate. The platens 4 are heated and the rollers 5 are of metal so they transmit heat from the platens to the respective belts 3. A tensioning device 10 connected to the downstream drums 8 keeps the belts 3 taut.

Figure 3:
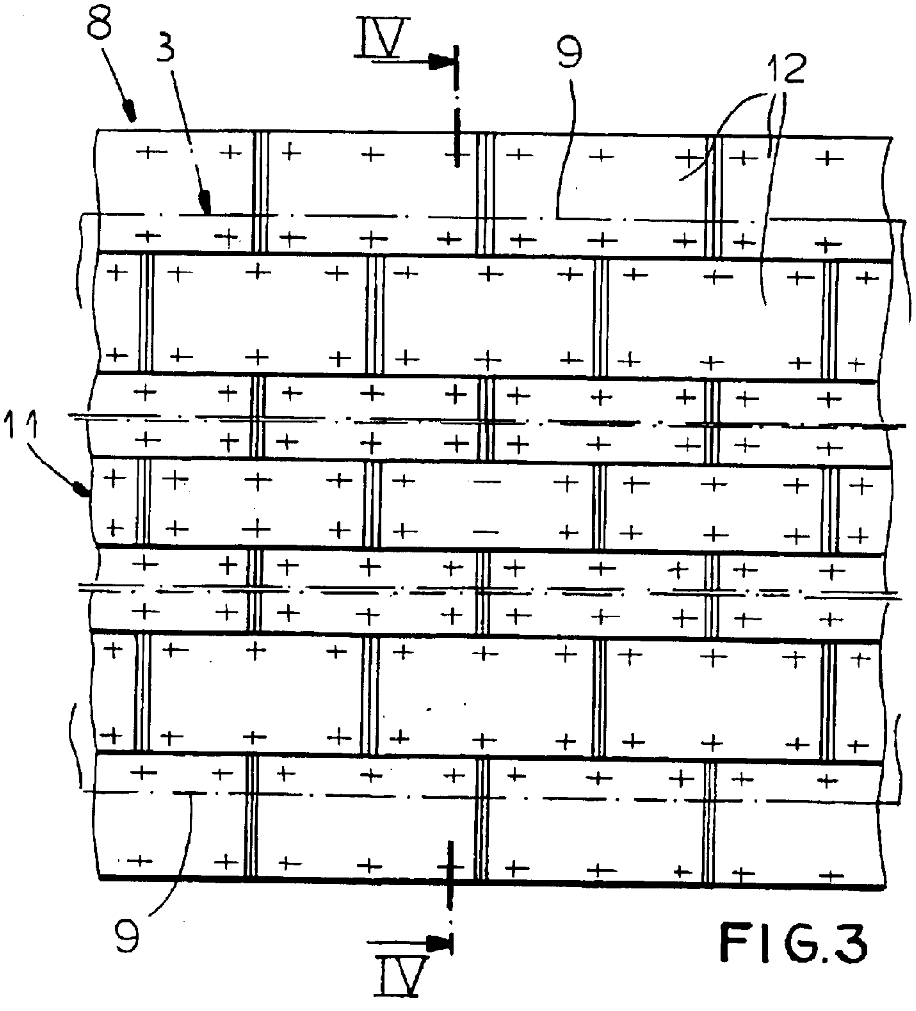
FIG. 3 is a top view of a belt drum.
Figure 4:
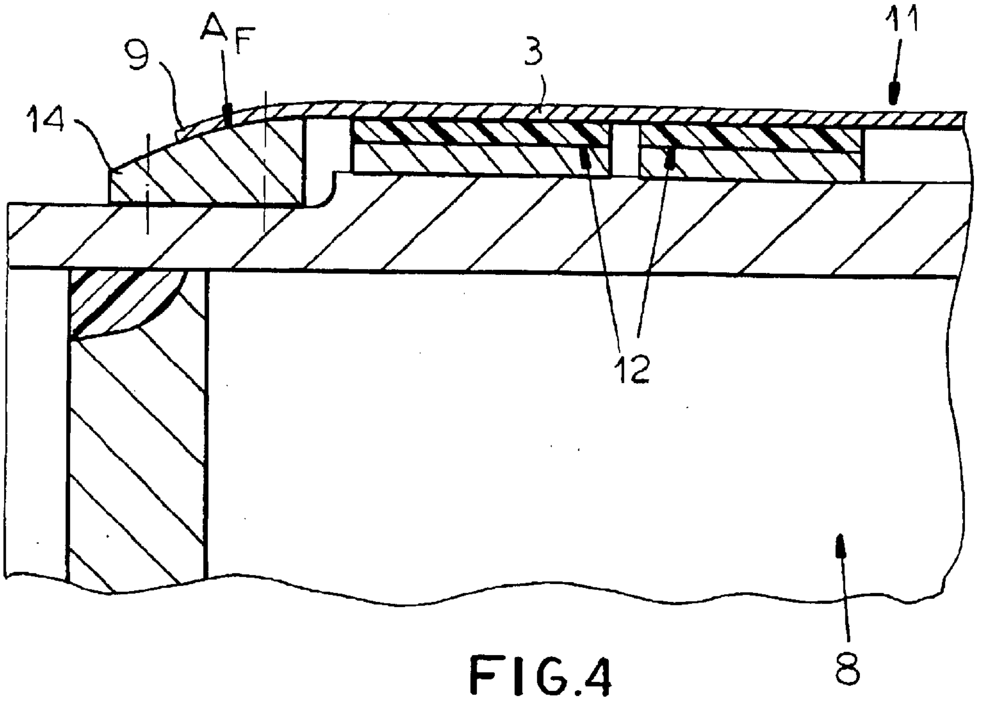
FIG. 4 is a section taken along line IV—IV of FIG. 3.
Figure 5:
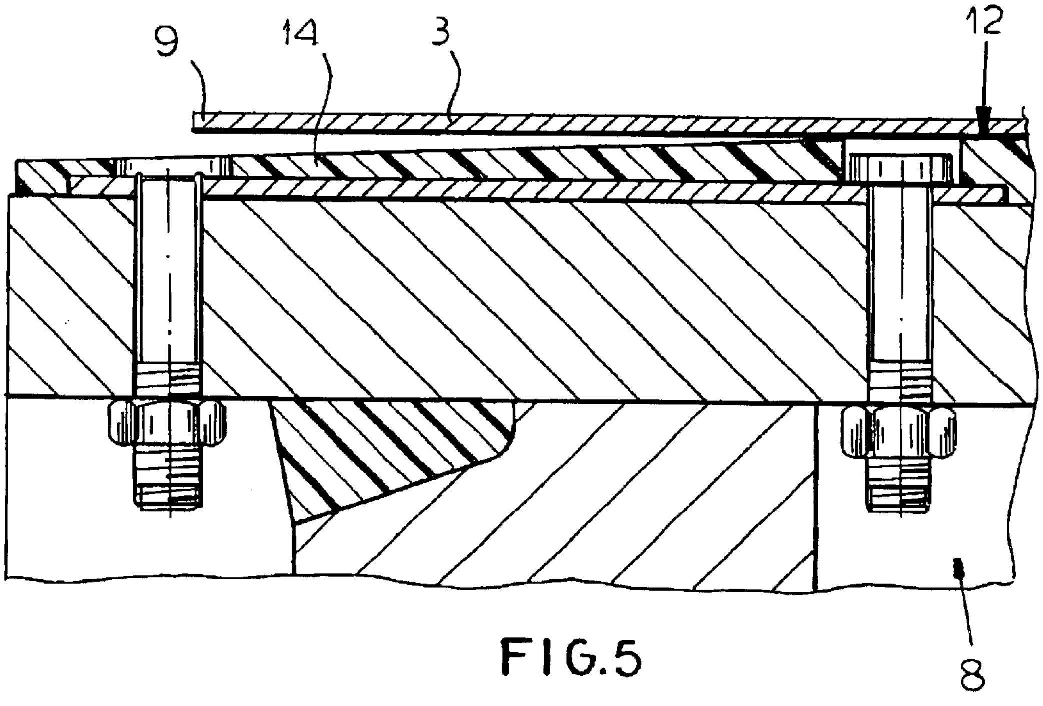
FIG. 5 is a view like FIG. 4 of an alternative drum according to the invention.

The belts 3 as illustrated in FIGS. 3, 4, and 5 have a central region 11 in solid contact with the rollers 5 and edge strips 9 that project transversely of the transport direction past these rollers 5 so that they are essentially out of contact with them and, therefore, not efficiently heated by the respective platens 4. In the central region or strip 11 as also shown in FIGS. 3 through 5 the drums 7 and 8 are covered with friction strips or pads 12 carried on steel backing strips or plates that are bolted to the drums 7 and 8. Thus the portions of the drums 7 and 8 engaging the central region 11 are of cylindrical shape, with a constant radius of curvature and a shape perfectly centered on the respective axes 7A and 8A.

In accordance with the invention the edge strips 9 of the belts 3 projecting past the rollers 5 engage end formations or rings 14 that have outer surfaces A, that are centered on the respective axes 7A and 8A but that are curved or frustoconical so that they decrease in diameter or radius of curvature axially outward. In this manner these unheated edge strips 9 of the belts 3 will not be excessively stressed since they will be able to curl or bend in somewhat, as will inherently happen because they will be somewhat shorter as a result of their lower temperature. The longitudinal stress in the belts 3 will therefore be the same over their entire widths instead of much greater at the edge strips 9 as in prior-art systems where the drum surfaces are cylindrical over their entire lengths.

EXAMPLE

A belt has a length l of 65 m and the working stretches in actual contact with the workpiece W have a length of 40 m. There is a temperature differential $\Delta T$ of 80° C. between the hot center region 11 and the cooler edge strips 9. This produces in the edge strips 9 a stretch $\epsilon$ as follows:

$$\epsilon=\alpha\cdot\Delta T==11\cdot10^{-6}\cdot80°=8.8\cdot10^{-4}.$$

Hence $$\epsilon=\Delta l/l\geqq\Delta l=8.8\cdot10^{-4}\cdot40\text{ m}=35\text{ mm}.$$

The drums 7 and 8 have a diameter D of 2950 mm producing a circumference $\phi$ as follows:

$$\phi=\pi\text{ D}=9267\text{ mm}.$$

The belts 3 are only looped around half, that is 180°, of the drums 7 and 8 so that $$\phi/2=4633\text{ mm}.$$

Since the colder and shorter belt edges 9 the circumference $\phi$ of the drums 7 and/or 8 where they contact these edges 9 must be $$4633\text{ mm}-35\text{ mm}=4598\text{ mm}.$$

This corresponds to a diameter of 2972 mm at the formations 12, some 23 mm smaller in diameter, 11.5 mm in radius, than at the drum centers.

We claim:

1. In a continuous belt press having:

a frame having horizontally extending and vertically spaced upper and lower platens defining a horizontally extending gap having an upstream end and a downstream end;

vertically spaced upper and lower upstream drums rotatable on the frame about respective horizontal drum axes at the upstream end;

vertically spaced upper and lower downstream drums rotatable on the frame about respective horizontal drum axes at the downstream end;

upper and lower endless steel belts spanned over the respective upper and lower drums and each having a working stretch lying between the platens and a return stretch;

upper and lower sets of rollers engaged between the working stretches and the respective platens; and means connected to the drums for advancing the belts to move the working stretches horizontally in a transport direction to displace a workpiece in the direction through the gap, the improvement wherein each belt further has a pair of edges projecting transversely past the respective rollers, and at least one of the drums of each of the belts has a substantially cylindrical central region of a predetermined central diameter bearing through the respective rollers on the working stretch of the respective belt and a pair of edge formations of smaller diameter than the central-region diameter lying outside the central region and in engagement with the edges of the respective belt.

2. The continuous belt-type press defined in claim 1 wherein the one drum of each of the belts is provided in its central region with friction pads forming a cylindrical drum outer surface and with end rings flanking the friction pads and forming the edge formations.

3. The continuous belt-type press defined in claim 2 wherein the edge formations form radially outwardly convex curved surfaces engaging the respective edges.

4. The continuous belt-type press defined in claim 2 wherein the edge formations form frustoconical surfaces engaging the respective edges and centered on the respective axes.

* * * * *